United States Patent

[11] 3,584,437

| [72] | Inventor | Raymond N. Boyington |
| | | Star Route, Milford, Maine 04461 |
| [21] | Appl. No. | 745,524 |
| [22] | Filed | July 17, 1968 |
| [45] | Patented | June 15, 1971 |

[54] DEVICE FOR CONTROLLING HORSES
13 Claims, 6 Drawing Figs.

[52] U.S. Cl. ..................................................... 54/8
[51] Int. Cl. ............................................. B68b 01/06
[50] Field of Search ........................................... 54/8, 7, 9, 13, 14, 15

[56] References Cited
UNITED STATES PATENTS
| 68,623 | 9/1867 | Hale | ........................... | 54/8 |
| 212,935 | 3/1879 | Holland et al. | ........................... | 54/8 |
| 327,139 | 9/1885 | Clemons | ........................... | 54/8 |
| 848,937 | 4/1907 | Turner | ........................... | 54/8 |

Primary Examiner—Hugh R. Chamblee
Attorney—Shanley and O'Neil

ABSTRACT: Universal breaking, correcting, and training device for controlling horses permitting selective use of pressure on a horse's nose, lips, bars, and chin. An integral bit structure providing curb bit action or a combination of snaffle bit action and curb bit action is taught. In addition, structure providing selective use of nose strap and chin strap pressures of varying degrees is taught. The selectivity in pressure control areas available helps maintain sensitivity for desired control.

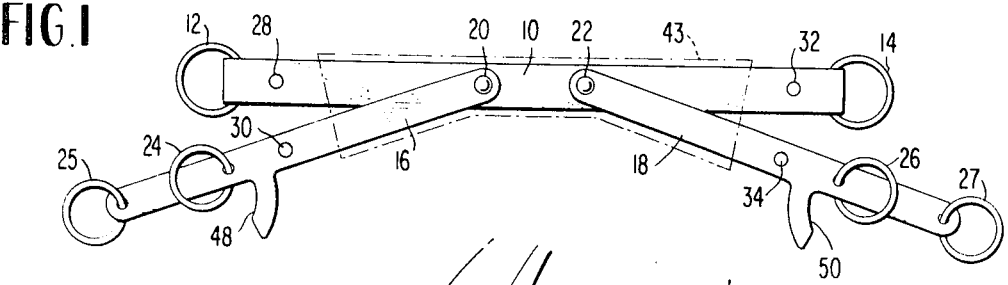
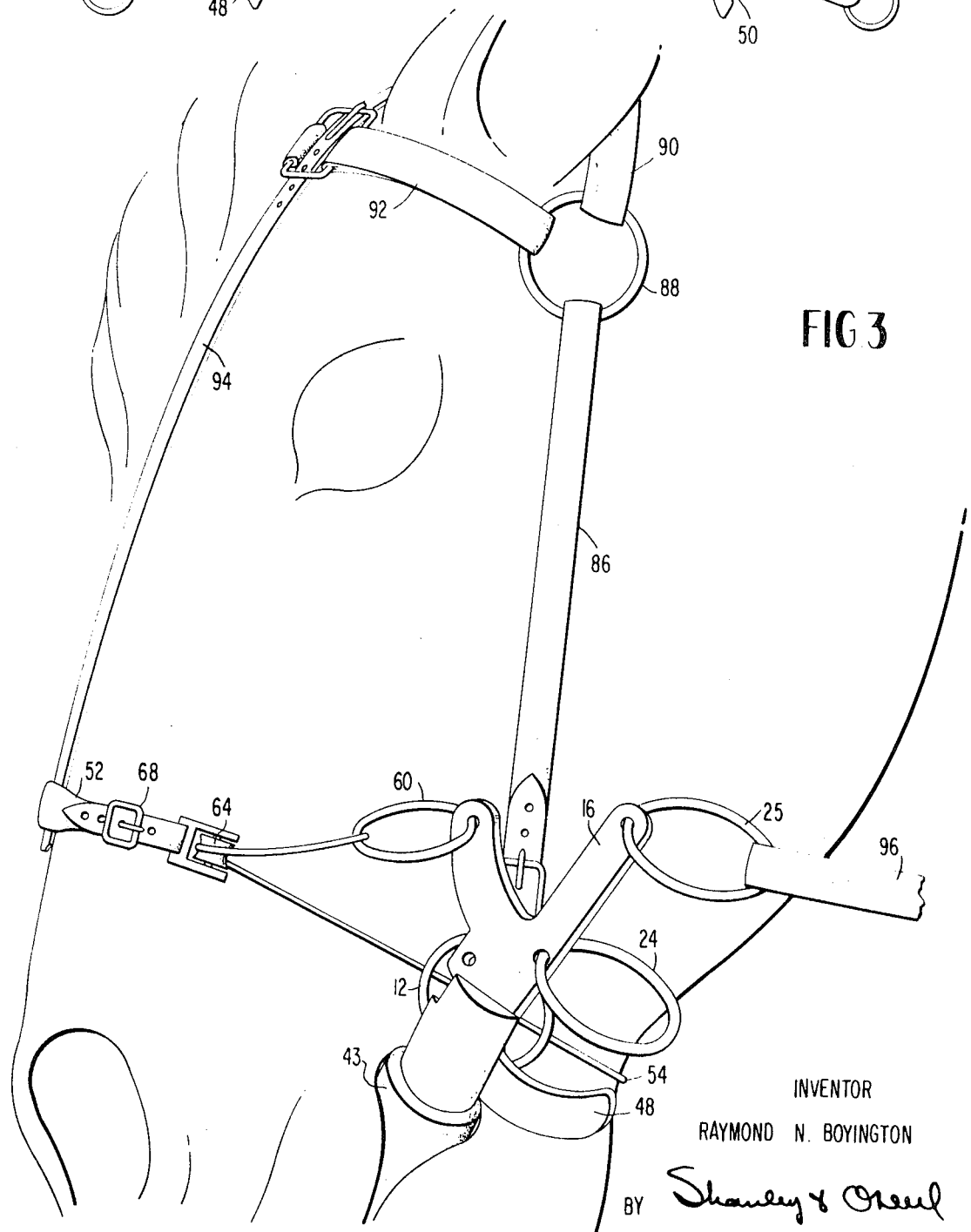

INVENTOR
RAYMOND N. BOYINGTON

BY Shanley & O'Neil

ATTORNEYS

DEVICE FOR CONTROLLING HORSES

This invention is concerned with horse control means including bridle support and bit structure adaptable to all phases of horse training and control.

Bits and bridles are primarily for communicating with a horse in order to obtain desired performance. Sensitive areas about a horse's head for exercising control include the nose, lips, bars (interval on a horse's lower jaw between frontal teeth or tushes and rearward grinders), and chin. One problem with prior art bridles and bits is that one or another of these sensitive areas is usually overused to the exclusion of the others. By concentration of control in one area, sensitivity of the area is lost, especially during training of a horse, and poor training and bad habits generally result.

The present invention seeks to solve these difficulties resulting from prior art bridles and bits by providing structure which permits use of a combination of sensitive control areas about a horse's head either alternately or simultaneously for exercising control and obtaining desired performance.

Referring to the drawings:

FIG. 1 is a schematic presentation of bit structure embodying the invention,

FIG. 3 is a perspective view of the structure of FIG. 2 as used on a horse.

Like reference numerals have been used where possible throughout the drawings to represent like parts.

Figure 2:
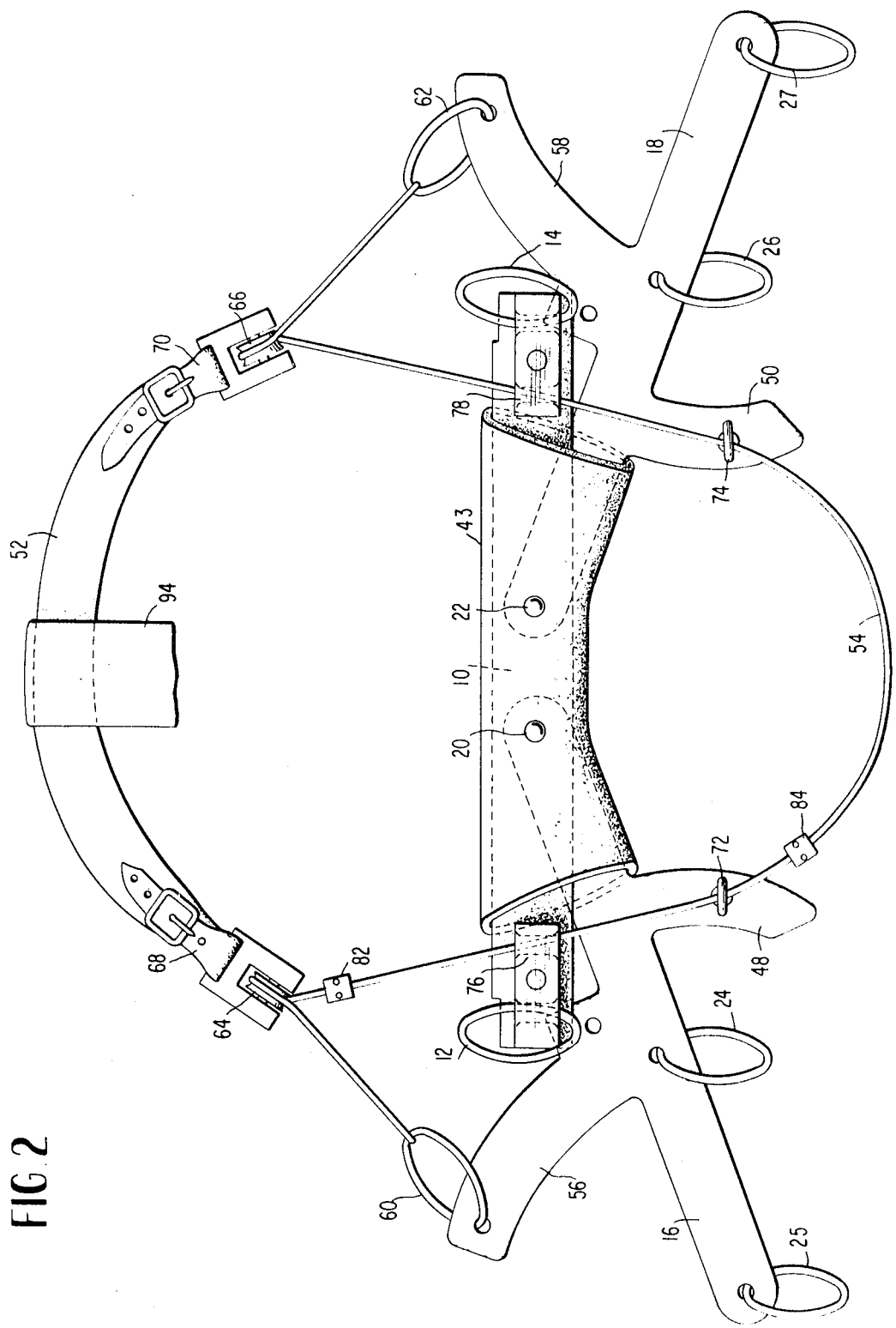
FIG. 2 is a plan view of combination bit and bridle structure, with portions of the bridle cut away, embodying the invention.

Bits available in the past can be classified generally as having either snaffle action or curb action. A snaffle bit has jointed arms forming a buckle within a horse's mouth. The arms of the snaffle act on the lips of the horse at the corners of its mouth. A curb-type bit has a solid bar which acts on the bars of the horse's lower jaw within its mouth and may employ a curb chain acting on a horse's chin.

FIG. 1 illustrates a bit for providing optional selection to the user of either curb bit action or a combination of snaffle and curb bit action. The novel bit includes an elongated curb bar 10 with rings 12 and 14 mounted at its opposite longitudinal ends. In use, the bit structure of FIG. 1 is attached to bridle cheek straps by means of rings 12 and 14.

A pair of snaffle arms 16, 18 are secured to the elongated bar 10 in a longitudinally central location. The snaffle arms are pivotally mounted at 20 to 22 at their inner longitudinal end and extend outwardly. Rings 24, 25 and 26, 27 at the outer longitudinal ends of snaffle arms 16 and 18 are for receiving reins. Leverage applied through the reins is selectable with this plurality of rings.

In addition to free pivotal movement about pins 20, 22, the snaffle arms can be locked in substantially parallel relationship to curb bar 10 by means of pin-receiving means 28 and 30 for arm 16 and pin-receiving means 32, 34 for arm 18. When the snaffle arms are locked in parallel relationship to the elongated curb bar, the bit provides essentially curb bit action. When the snaffle arms are free to pivot, the bit provides a combination of curb and snaffle bit action.

The control bar 10 and snaffle arms 16 and 18 can be covered with a flexible sleeve 43, made from rubber, for example, for added mouth protection for horses.

In addition, snaffle arm 16 and 18 can include curved members 48 and 50, respectively, extending transverse to the longitudinal axes of the snaffle arms in a rearward direction. These transverse arms act on exterior portions of the horse's lower lip as part of the horse control. They also help to position the bit for better overall functioning of the bit structure. Their location longitudinally of the snaffles can be adjusted to accommodate various mouth widths.

In addition to the novel bit structure of FIG. 1, the invention includes means for exercising control over a horse using other sensitive areas about the horse's head. These are shown in FIG. 2. Portions of the bit structure identical to that shown in FIG. 1 use the same reference numerals although the bit includes additional control means.

The additional control means include a nose strap 52 and a chin strap 54 for applying pressure on the horse's nose and chin, respectively.

Snaffle arms 16 and 18 are modified by the addition of forwardly extending transverse arms 56 and 58, respectively. Rings 60 and 62 are mounted at the ends of these transverse arms.

Nose strap 52 includes pulleys 64 and 66 at its ends mounted to the nose strap by adjustable belt means 68 and 70, respectively.

Rearwardly projecting transverse arms 48 and 50 include eyelets 72 and 74, respectively. Control bar 10 also includes guiding eyelets 76 and 78.

A control line means for the nose strap and forming the chin strap 54 extends from ring 60 around pulley 64, through eyelets 76 and 72, around the chin of the horse where it acts as chin strap 54 through the eyelets 74 and 78, around pulley 66, to ring 62. This control line can include clamps 82 and 84 which can be adjusted along the length of the control line to act as stops.

In the operation the control means just described reins are connected to the rings 24 or 25 and 26 or 27. Rearward force on the reins pulls backwardly on the control line means through rings 60 and 62. Control line means acting through the pulleys 64 and 66 exerts pressure on the nose through the nose strap 52. At the same time pressure is exerted on the chin of the lower jaw of the horse through chin strap 54 which, as shown, is part of the control line.

It will be observed that the pressure of the nose strap and the chin strap is adjustable and that pressure can be exerted on the nose strap, the chin strap and on the lips of the horse through the snaffle action of arms 16 and 18 or on the horse's bars through the curb bar 10. Various adjustment are possible to increase the pressure at selected sensitive areas or to increase the effect of the structure on one or another side of the horse to have a greater force exerted on one side. The latter selection would be used, for example, if the horse were canting or turning his head to one side.

The structure of FIG. 2 is shown in use on a horse in FIG. 3. The bit structure is supported by cheek strap 86 connected to ring 88 and crown piece 90. Head band 92 extends across the forward surface of the horse's face. Strap 94 is connected to noseband 52 to support the noseband. Rein 96 is connected to ring 25. The various adjustments in the bridle means shown permit the device to be used on differing size and configuration of horse heads.

The device permits selection of points of pressure control or distribution of pressure control to various points about a horse's head. Either one or both of the snaffle arms can be locked in desired position, it can be operated without the nose and chin strap control, or with selected individual pressure on the nose and chin strap control.

The weight of flexible sleeve 43 can be also be selected to vary the constraining force on the snaffle arms. The leverage through the reins can be varied by positioning of the reins along the snaffle arms.

Figure 4:
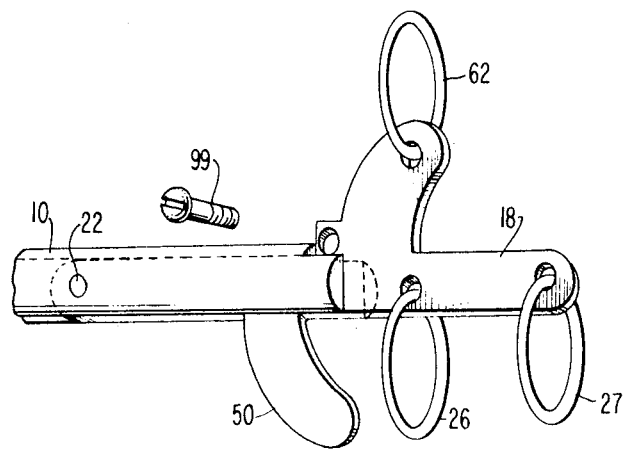
FIGS. 4, 5 and 6 are perspective views of portions of a specific embodiment of the bit of FIGS. 2 and 3.
Figure 5:
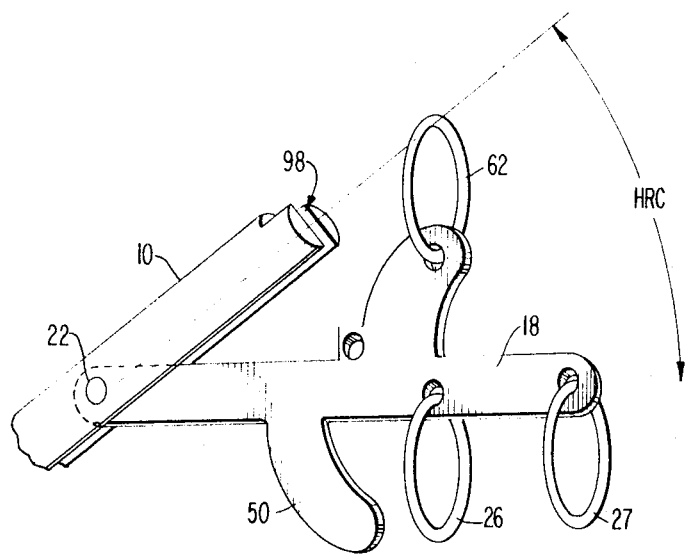
Figure 6:
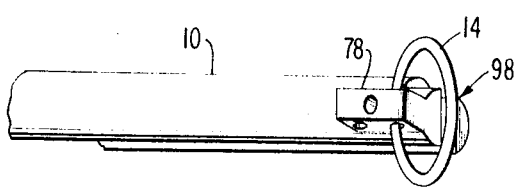

Referring to FIGS. 4 and 6, in the specific embodiment of the invention, snaffle arm 18 is pivoted for movement within slot 98 of curb bar 10 and is locked into parallel position by lockscrew 99. Slot 98 is three-sided so that snaffle arm 18 cannot move forward, in relation to the horse's head of its position when locked in parallel relationship to curb bar 10.

It can be seen that the various sensitive areas about a horse's head can be used alternately or simultaneously so that horse control can readily be adapted to the particular horse or the particular rider. This selectivity will be obvious to those skilled in the art without setting forth further specific examples, therefore the scope of the invention is to be determined from the appended claims.

What I claim is:

1. Integral curb and snaffle bit structure comprising:

elongated curb bar with means at its longitudinal ends for securing the elongated curb bar to a bridle, a pair of elongated snaffle arms each having one longitudinal end pivotally connected to the elongated curb bar, such pivotally connected ends being positioned inwardly from longitudinal ends of the elongated curb bar with the remaining longitudinal ends of the snaffle arms extending in opposite directions toward the longitudinal ends of the elongated curb bar, means at the remaining longitudinal ends of the snaffle bit arms for receiving reins, and interlocking means provides on the elongated snaffle arms between the pivotally connected ends and the rein receiving ends of the snaffle arms and on the elongated curb bar intermediate the pivotal connection of the snaffle arms and the means for securing the elongated curb bar to a bridle and adapted to receive means for interlocking the snaffle arms in substantially parallel relationship to the elongated curb bar.

2. The structure of claim 1 which the elongated curb bar is slotted to receive the elongated snaffle arms internally.

3. The structure of claim 1 in which the means at the longitudinal ends of the snaffle arms for receiving reins include a plurality of rein-receiving rings spaced longitudinally of the snaffle arms.

4. Device for controlling a horse comprising:
bit structure including an elongated curb bar and a pair of elongated snaffle arms each having one end pivotally connected to the elongated curb bar inwardly from longitudinal ends of elongated curb bar with remaining longitudinal ends of the snaffle arms extending in opposite directions toward the longitudinal ends of the elongated curb bar, ring means at the remaining longitudinal ends of the snaffle arms, bridle means for supporting the bit structure in a horse's mouth, elongated noseband means supported by the bridle means, control line means extending from the ring means contiguous to the remaining longitudinal ends of the snaffle arms, connected to the noseband means and extending rearwardly for circumscribing the horse's chin groove of its lower jaw so that force exerted in a rearward direction on the snaffle arms exerts pressure on the nose and chin groove of the lower jaw of the horse.

5. The device of claim 4 further including a flexible sleeve means for covering those portions of the elongated curb bar and snaffle arms within the horse's mouth.

6. The device of claim 4 in which the length of the noseband means is adjustable.

7. The device of claim 4 in which the snaffle arms include lateral crosspieces at a substantial angle to the longitudinal axis of the snaffle arms, the crosspieces being located so as to be external of the horse's mouth, with one crosspiece on each snaffle arm extending in a rearward direction along the chin of the lower jaw of the horse and with another cross piece on each snaffle arm extending in a forward direction toward a longitudinal end of the noseband means, each crosspiece having means for receiving control line means.

8. The device of claim 7 in which the control line means interconnects the forward crosspiece on each snaffle arm to the adjacent longitudinal end of the noseband and extends through the means for receiving control line means on the rearwardly extending crosspieces of the snaffle arms around the chin groove of the lower jaw of the horse.

9. The device of claim 4 including means at the longitudinal ends of the snaffle arms for receiving reins.

10. The device of claim 9 which the means for receiving reins include a plurality of rings spaced longitudinally of the snaffle arms.

11. The device of claim 4 including means for securing the snaffle arms in substantially parallel relationship to the elongated curb bar.

12. Integral curb and snaffle bit structure comprising:
elongated curb bar with means at its longitudinal ends for securing the elongated curb bar to a bridle, a pair of elongated snaffle arms each having one longitudinal end pivotally connected to the elongated curb bar, such pivotally connected ends being positioned inwardly from longitudinal ends of the elongated curb bar with the remaining longitudinal ends of the snaffle arms extending in opposite directions toward the longitudinal ends of the elongated curb bar, means at the remaining longitudinal ends of the snaffle bit arms for receiving reins, means located between the pivotally connected ends and the rein receiving ends of the snaffle bit arms for securing the snaffle bit arms in substantially parallel relationship to the elongated curb bar, and flexible sleeve means in overlaying relationship to portions of the elongated curb bar and the elongated snaffle arms adapted to fit within a horse's mouth, the flexible sleeve means acting to constrain the snaffle arms in substantially parallel relationship with the elongated curb bar 13. Integral curb and snaffle bit structure comprising:
elongated curb bar with means at its longitudinal ends for securing the elongated curb bar to a bridle, a pair of elongated snaffle arms each having one longitudinal end pivotally connected to the elongated curb bar, such pivotally connected ends being positioned inwardly from longitudinal ends of the elongated curb bar with the remaining longitudinal ends of the snaffle arms extending in opposite directions toward the longitudinal ends of the elongated curb bar, means at the remaining longitudinal ends of the snaffle bit arms for receiving reins, means located between the pivotally connected ends and the rein receiving ends of the snaffle bit arms for securing the snaffle bit arms in substantially parallel relationship to the elongated curb bar, and positioning means on the elongated snaffle arms extending in transverse relationship to the longitudinal axis of each snaffle arm, such means being located so as to act on portions of a horse's lower lip exterior of the horse's mouth.